(12) United States Patent
Fahldieck et al.

(10) Patent No.: US 9,499,353 B2
(45) Date of Patent: Nov. 22, 2016

(54) CONTAINER CONVEYOR DEVICE (71) Applicant: KHS GmbH, Dortmund (DE)

(72) Inventors: Andreas Fahldieck, Idar-Oberstein (DE);
(Continued)

(73) Assignee: KHS GmbH, Dortmund (DE)

(*) Notice: Subject to any disclaimer, the term of this patent is extended or adjusted under 35 U.S.C. 154(b) by 0 days.

(21) Appl. No.: 14/898,245

(22) PCT Filed: Jun. 12, 2014

(86) PCT No.: PCT/EP2014/062228
§ 371 (c)(1),
(2) Date: Dec. 14, 2015

(87) PCT Pub. No.: WO2014/198824
PCT Pub. Date: Dec. 18, 2014

(65) Prior Publication Data
US 2016/0145090 A1    May 26, 2016

(30) Foreign Application Priority Data

Jun. 12, 2013  (DE) ........................ 10 2013 106 084

(51) Int. Cl.
*B65G 47/84* (2006.01)
*B65G 29/00* (2006.01)
(Continued)

(52) U.S. Cl.
CPC ............. *B65G 47/846* (2013.01); *B65G 29/00* (2013.01); *B67B 3/00* (2013.01); *B67B 3/02* (2013.01);
(Continued)

(58) Field of Classification Search
CPC .............. B65G 47/846; B65G 2207/08; B65B 43/50; B67C 7/0046
(Continued)

(56) References Cited

U.S. PATENT DOCUMENTS

| | | | |
|---|---|---|---|
| 7,007,793 B2* | 3/2006 | Stocchi | B65G 29/00 198/473.1 |
| 9,181,043 B1* | 11/2015 | Goudy | B65G 29/00 |
| 2015/0353297 A1* | 12/2015 | Fahldieck | B65G 47/847 53/285 |

FOREIGN PATENT DOCUMENTS

| | | |
|---|---|---|
| DE | 601 14 777 | 8/2006 |
| EP | 2 684 805 | 1/2014 |

* cited by examiner

*Primary Examiner* — Mark A Laurenzi
*Assistant Examiner* — Timothy P Kelly
(74) *Attorney, Agent, or Firm* — Occhiuti & Rohlicek LLP (57) ABSTRACT

A conveyor device having a rotor and container carriers that suspend containers around the rotor includes a container support to support the sides of the suspended containers. The container support has an outer container guide with a height-adjustable outer container support surface that defines a tapered surface surrounding a machine axis about which the rotor rotates. The outer container support surface supports the containers on a radially outward portion of their surface and an inner container support surface supports the containers on a radially inward position of their lateral surface. The two support surfaces define a receptacle that receives the container's base. The receptacles width decreases as a function of distance from the container carriers. The inner container support surface is height-adjustable for adapting the container support device to different container base diameters.

14 Claims, 9 Drawing Sheets

(72) Inventors: Andreas Krieg, Dittelsheim-Hessloch (DE); Thomas Reimann, Guldental (DE)

(51) Int. Cl.
*B67B 3/02* (2006.01)
*B67C 7/00* (2006.01)
*B67B 3/00* (2006.01)
*B67C 3/26* (2006.01)

(52) U.S. Cl.
CPC ....... *B67C 7/004* (2013.01); *B65G 2201/0247* (2013.01); *B65G 2207/08* (2013.01); *B67C 2003/2668* (2013.01)

(58) Field of Classification Search
USPC .............. 141/152, 164, 177, 266; 198/468.2, 198/803.11, 803.15, 836.3
See application file for complete search history.

CONTAINER CONVEYOR DEVICE

RELATED APPLICATIONS

Under 35 USC 371, this is the national stage of international application PCT/EP2014/062228, filed on Jun. 12, 2014, which claims the benefit of the Jun. 12, 2013 priority date of German application DE 102013106084.6, the contents of which are herein incorporated by reference.

FIELD OF INVENTION

The invention relates to container processing, and in particular, to container conveyor devices.

BACKGROUND

Container treatment machines typically include rotors that carry containers around a circular path. These rotors often have treatment positions around their periphery for treating the bottles. For example, in a filling machine, the treatment position would be a filling head. In a capping machine, the treatment position would be a capping head.

Many of these treatment positions suspend a container. This poses a difficulty when the rotor rotates at high speed. In particular, such rotation leads to significant centrifugal forces that directly affect the containers. These forces cause the containers' bases to swing radially outward relative to the machine axis. As a result, the containers hang at an inclined angle during treatment.

This inclined orientation can greatly impede proper treatment, particularly in the case of capping machines and filling machines. In capping machines, the inclined orientation of the containers can result in skewed caps. In filling machines, the inclined orientation can lead to incomplete filling and contamination from spilled product.

The inclined orientation affects other rotary machines. For example, in inlet and outlet transfer stars, the inclined orientation results in containers not being properly transferred, jamming, breaking, and/or backing up.

SUMMARY

It is the object of the invention to provide a container conveyor that avoids the aforesaid disadvantages and that can be easily adapted to suit containers of different sizes or different diameters by way of height adjustment alone.

In one aspect, the container conveyor is part of a container treatment machine, and in particular, that part of the container treatment machine on which the treatment of the containers takes place and/or on which the treatment positions are formed.

Embodiments of the invention include those in which a container conveyor device has an inner container support surface that rotates with the rotor, those in which a container conveyor device has an inner container support surface formed from inner support surfaces, those in which a container conveyor device has inner support surfaces that are container pockets that receive the containers over part of the periphery of their container base and that are open radially outwards relative to the machine axis, those in which a container conveyor device is configured such that each container carrier is associated with a dedicated container pocket, those in which a container conveyor device is configured such that container support surfaces of container pockets are configured to be shaped like a cone or a truncated cone, those in which a container conveyor device is configured such that container pockets are provided on a common carrier that is configured as a carrier ring and that is height-adjustable by an adjustment device, those in which a container conveyor device has an outer container guide that is height-adjustable by an adjustment device, those in which a container conveyor device has an inner container support surface that is configured not to rotate with the rotor, those in which a conveyor support surface has an inner container support surface and an outer container support surface that together form a gully-like channel, such as a v-shaped guide channel, that extends along a trajectory over which the container bases of the containers that are moved with the rotor move, with the guide channel being height-adjustable by at least one adjustment device, those in which a container conveyor device is configured such that a guide channel thereof also extends into a transfer region at which the containers are transferred to and/or withdrawn from the rotor's container carriers, those in which a container conveyor device has a guide channel that also extends into a region of the trajectory of the container bases of the containers that are held suspended from a transport star of a container inlet and/or container outlet, those in which a container conveyor device has a spindle drive for an adjustment device, and those in which a container conveyor device has any combinations of the foregoing features. As used herein, "height adjustment" refers to an adjustment in which at least a main component of an adjustment movement takes place along a direction parallel to a machine axis.

In one aspect, the invention features an apparatus for processing containers. Such an apparatus includes a conveyor device having a rotor that rotates about a vertical machine axis, container carriers distributed on the rotor about the machine axis for suspending containers, and a container support device that supports suspended containers. The container support device includes an outer container guide that has an outer container support surface. The outer container support surface defines a tapered surface that surrounds the machine axis and supports the containers on a radially outward portion of a lateral surface near their respective bases. The outer container support surface is also height-adjustable to enable adaptation to different container base diameters. Meanwhile, an inner container support surface lying opposite the outer container support surface supports the containers on a radially inward position of the lateral surface. These two surfaces, the inner container support surface and the outer container support surface, together define a receptacle for receiving a container base. This receptacle has a width that decreases as a function of distance from the container carriers. The inner container support surface is also height-adjustable for adapting the container support device to different container base diameters.

In some embodiments, the inner container support surface rotates with the rotor. These include embodiments that have container pockets opening radially outward. These container pockets form the inner container support surface. Each of the pockets receives at least a part of a container base's circumference. Among these are embodiments in which each container pocket is associated with a corresponding container carrier, and embodiments in which each of the container pockets defines a truncated cone. Also among these embodiments are those that include a carrier ring and an adjustment device. In such embodiments, the pockets are provided on the carrier ring, and the adjustment device is configured to adjust a height of the carrier ring. Also among these embodiments are those that include a carrier ring and a spindle drive. In these embodiments, the pockets are provided on the carrier ring and the spindle drive is configured to adjust a height of the carrier ring.

Some embodiments further include an adjustment device configured to adjust a height of the outer container guide.

Yet other embodiments include an adjustment device. In these embodiments, the inner container support surface is configured to not rotate with the rotor. The inner container support surface forms, together with the outer container support surface, a gully that extends along a trajectory over which container bases of the containers move as the rotor moves the containers. The adjustment device adjusts a height of the gully. Among these embodiments are those in which the gully extends into a transfer region at which containers are transferred to container carriers of the rotor or withdrawn from the container carriers of the rotor, and those in which the gully extends into a region of a trajectory along which the container bases of the suspended containers traverse a path defined by a transport star at either a container inlet or a container outlet.

Embodiments further include those in which the container conveyor is part of a filling machine, those in which it is part of a capping machine, and those in which it is a part of a container-treatment machine.

As used herein, "containers" includes bottles as well other containers suitable for filling products that are in powdered form, that are granular, that are liquid or that are viscous, that are configured to be suspended from container carriers of a rotary transport element, and that are made of metal, glass, and/or plastic.

As used herein, expressions such as "essentially," "in essence," and "around" refer to variations from an exact value by ±10%, preferably by ±5%, and/or variations in the form of changes that are insignificant for the function.

Further embodiments, advantages, and possible applications of the invention arise out of the following description of embodiments and out of the figures. All of the described and/or pictorially represented attributes whether alone or in any desired combination are fundamentally the subject matter of the invention independently of their synopsis in the claims or a retroactive application thereof. The content of the claims is also made an integral part of the description.

BRIEF DESCRIPTION OF THE DRAWINGS

These and other features and advantages of the invention will be apparent from the following detailed description and the accompanying figures, in which.

DETAILED DESCRIPTION

Figure 1:
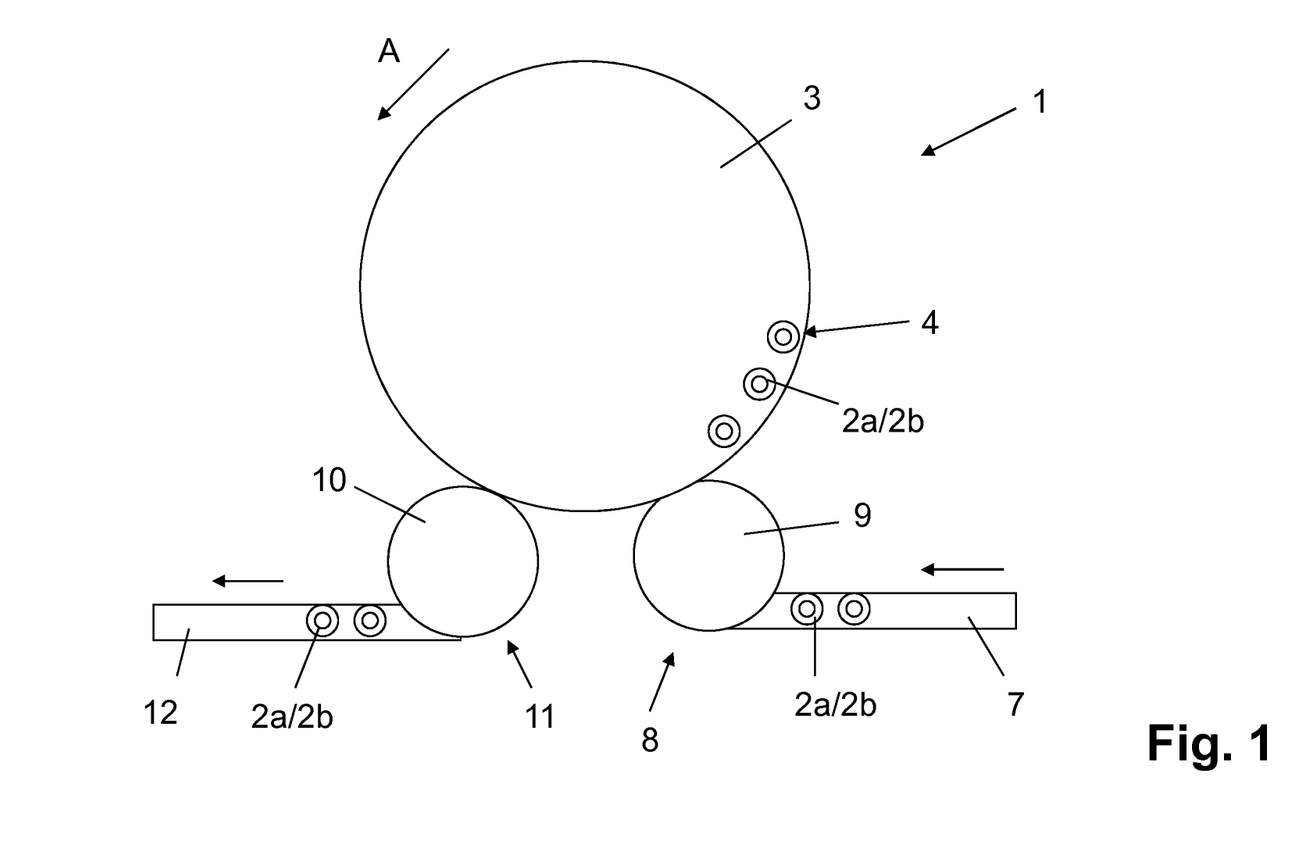
FIG. 1 shows a plan view a container-treatment machine with a container-conveyor device.

FIG. 1 shows a container-treatment machine 1 that is configured for processing large containers 2a, small containers 2b, and containers having sizes in between the large and small containers 2a, 2b. The large container 2a is thus the largest container that the container-treatment machine 1 is intended to accommodate. The small container 2b is the smallest container that the container-treatment machine 1 is intended to accommodate.

The containers 2a, 2b can be bottles, and in particular, PET bottles, that have different sizes and different diameters. The container-treatment machine 1 adapts to any size of container between these two extremes. Examples of container-treatment machines, without limitation, include filling machines for filling containers 2a, 2b and capping machines for capping filled containers 2a, 2b.

Figure 2:
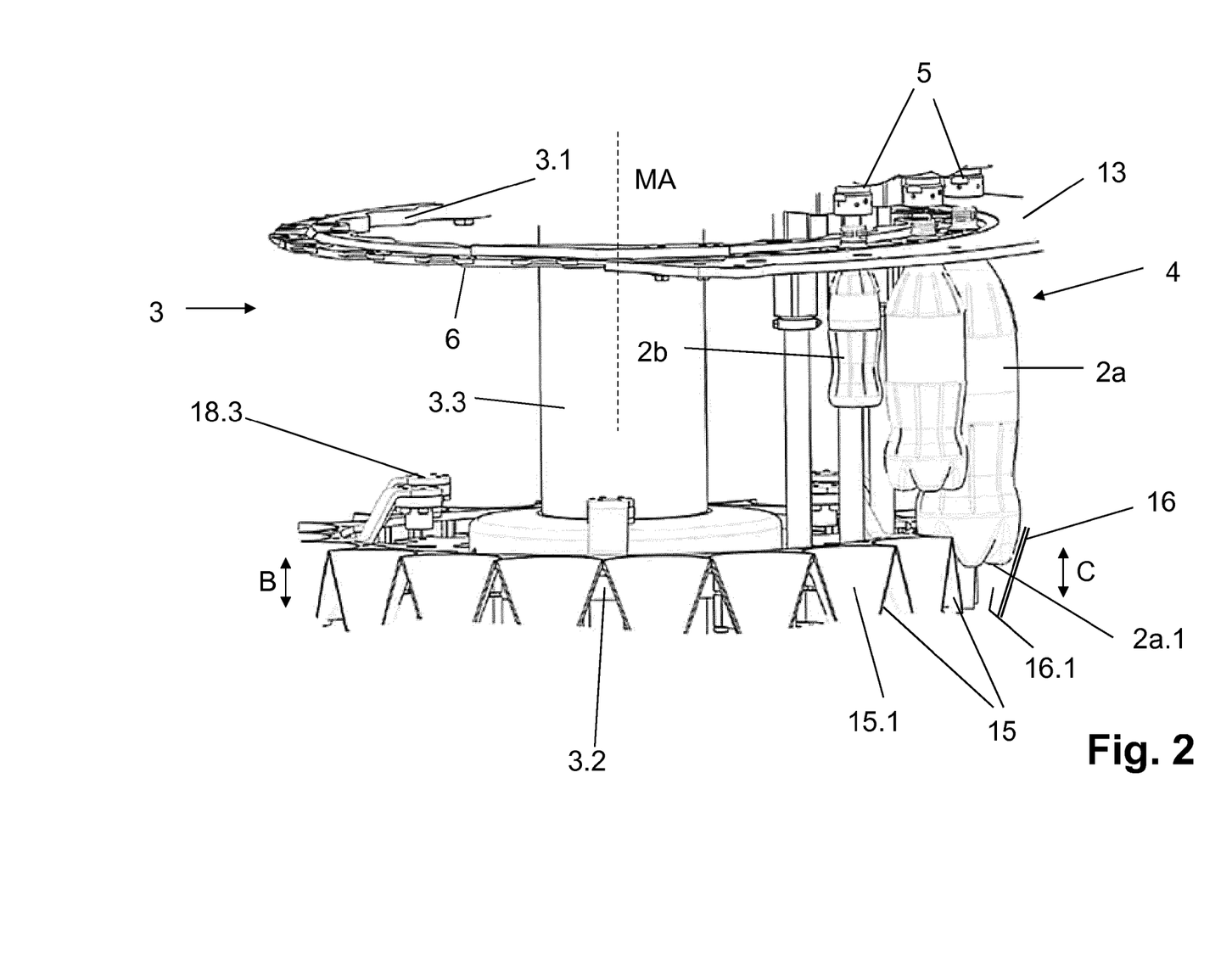
FIG. 2 shows a representation of a rotor from the container-treatment machine of FIG. 1 configured to treat a large container.

Referring now to FIG. 2, the container-treatment machine 1 includes a rotor 3 that rotates about a vertical machine axis MA in a rotation direction A. The rotor's periphery carries treatment positions 4 spaced at equal angular distances about the machine axis MA. Each treatment position 4 has a treatment head 5 and a container carrier 6. The treatment head 5 is adapted to the particular type of treatment. The container carrier 6 suspends a container 2a, 2b from a container flange beneath the container's mouth.

In the illustrated embodiment, the rotor 3 has an annular upper rotor element 3.1 and a disk-shaped circular lower rotor element 3.2. The upper rotor element 3.1 carries the container carriers 6. The lower rotor element 3.2 connects to a rotor column 3.3 that is driven to rotate with the rotor 3. Guide rods and/or retainer rods connect the upper rotor element 3.1 to the other elements of the rotor 3. A further rotor element, which cannot be seen in the figures, carries the treatment heads 5.

Referring back to FIG. 1, an outer transporter 7 feeds containers 2a, 2b that are to be treated to a container inlet 8 that includes a first transport star 9. The first transport star 9 feeds the containers 2a, 2b into the treatment positions 4. At a container outlet 11, a second transport star 10 removes treated containers 2a, 2b from the treatment positions 4 and places them on an outer transporter 12. The first and second transport stars 9, 10 rotate synchronously with the rotor 3 about their respective vertical axes.

As the rotor's rotary motion carries the containers 2a, 2b through an angular region between the container inlet 8 and the container outlet 11, the containers sustain treatment at their respective treatment positions 4.

An outer guide 13, best seen in FIG. 2, securely holds the containers 2a, 2b on the container carrier 6. Each container 2a, 2b has a container flange, or neck ring, formed just below its mouth. The containers 2a, 2b lie against the outer guide 13 with a region near the container flange bearing against the outer guide 13.

Figure 3:
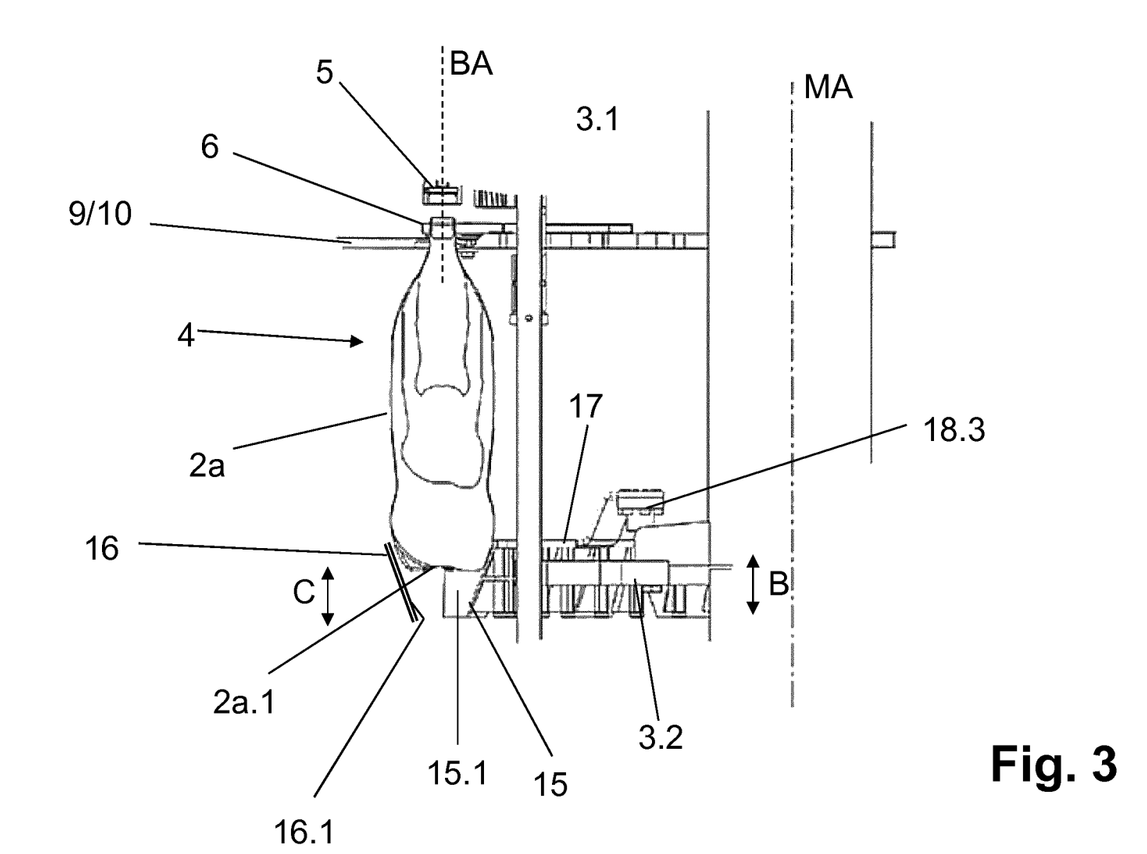
FIG. 3 shows a treatment position of the container-treatment machine of FIG. 1 configured to treat a large container.

When the rotor 3 is stationary, each container 2a, 2b extends along a nominal container axis BA, as shown in FIG. 3. As the rotor 3 rotates, a centrifugal force acts on each container 2a, 2b. This centrifugal force causes a torque that urges a base 2a.1 of a container 2a, 2b to swing radially outward. If otherwise unconstrained, the container's axis will then no longer be aligned with the nominal container axis BA. To resist this torque, the container-treatment machine 1 includes a first embodiment of a container-support device 14 beneath the container carrier 6.

Each treatment position 4 is associated with a conical container pocket 15 formed by an inclined or tapered outer container guide 16 that supports an outer or lateral surface of each container 2a, 2b in the region of container base 2a.1, 2b.1. The container pocket 15 opens radially outward relative to the machine axis MA.

The container pockets 15 are provided on a common carrier or carrier ring 17 that concentrically surrounds the machine axis MA, as seen in FIG. 3. In the illustrated embodiment the container pockets 15 lie on that side of carrier ring 17 that faces radially outwards relative to machine axis MA.

The carrier ring 17 is part of rotor 3. As a result, when the rotor 3 rotates about the machine axis MA, so does the carrier ring 17, and hence, the container pockets 15 and treatment positions 4 located thereon.

Each container pocket 15 has an inner support surface 15.1. In operation, the outer or lateral surface of a container 2a, 2b near its base 2a.1, 2b.1 lies on the inner support surface 15.1 of a container pocket 15.

Each container pocket 15 extends vertically along the nominal container axis BA. The diameter of a container pocket 15 varies as a function of vertical position. In particular, as one proceeds vertically away from the treatment head 5 along the nominal container axis BA, the pocket 15 becomes narrower.

In addition, the radial coordinate of the inner support surface 15.1 also varies as a function of vertical position. In particular, as one proceeds vertically away from the treatment head 5 along the nominal container axis BA, the radial coordinate of the inner support surface 15.1 becomes greater. The inner support surface 15.1 is thus part of a surface of a cone that is coaxial with the nominal container BA and that narrows as the vertical distance from the treatment head 5 increases. At the top of the cone, where the cone is nearest the treatment head 5, the cone's diameter is about equal to the base diameter of the large container 2a. At the opposite end, furthest from the treatment head 5, the cone's diameter is about equal to the base diameter of the small container 2.

The outer container guide 16 is shaped like a tapered ring that forms an outer container support surface 16.1. Containers 2a, 2b also lie by the outer surface of container base 2a.1, 2b.1 on the outer container support surface 16.1. The outer container support surface 16.1 decreases its radial distance from machine axis MA as its vertical distance from treatment heads 5 increases.

The outer container guide 16 is on a machine frame of the container-treatment machine 1. As a result, it does not rotate with the rotor 3. The outer container guide 16 extends over the angular range of the rotary motion of the rotor 3 between container inlet 7 and container outlet 11.

The container pockets 15 are configured in such a way that each one accommodates only part of a container's periphery, for example, more than half of its periphery. The allocation of the outer container guide 16 to the container pockets 15 is also selected in such a way that the radial distance between the outer container support surface 16.1 and that part of the inner container support surface 15.1 in the upper region of the container-support device 14 that lies closest to machine axis MA is about equal to the base diameter of the large containers 2a. Similarly, the corresponding radial distance in the lower region of the container-support device 14, i.e. in the region of the bottom edge of container pockets 15 and of the container guide 16, is about equal to the base diameter of the smaller containers 2b.

Figure 6:
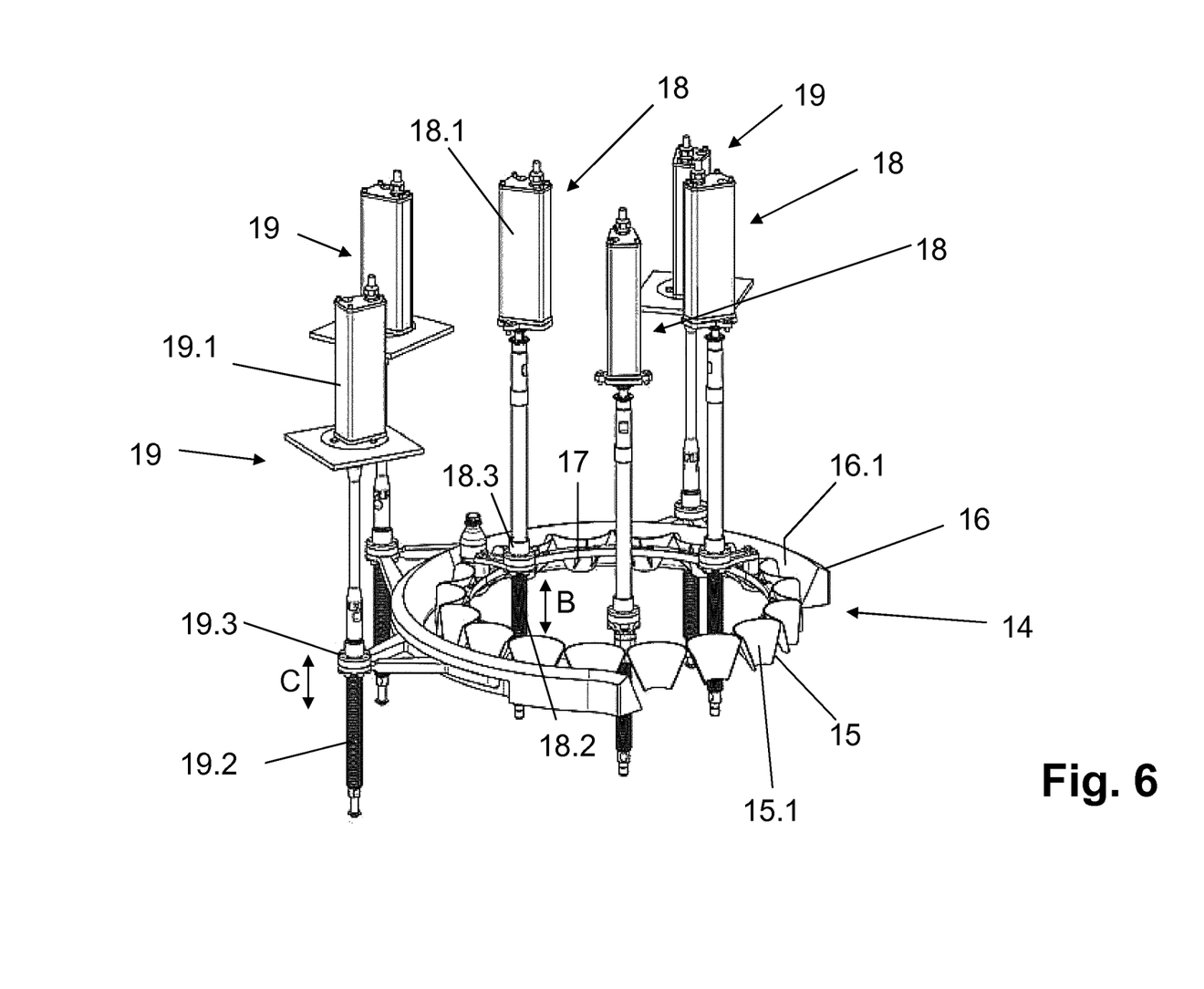
FIG. 6 shows a single representation of a container support device of the container-treatment machine of FIG. 1.

Referring to FIG. 6, first adjustment devices 18 on the rotor 3 adjust the vertical heights of the carrier ring 17, and hence the container pockets 15, along a vertical direction B. This height-adjustability enables the container-support device 14 to adapt to different container sizes and/or different container volumes. Similarly, second adjustment devices 19 on the machine frame adjust the height of the outer container guide 16 along the vertical direction C so as to adapt to different container sizes and container diameters. In some embodiments, the first and second adjustment devices 18, 19 are linear drives, such as spindle drives.

Each first adjustment device 18 has an electric servomotor 18.1, a threaded spindle 18.2 driven by the servomotor 18.1, and a female thread fitting 18.3. The threaded spindle 18.2, which has its center-line parallel to the machine axis MA, engages the female thread fitting 18.3.

Each second adjustment device 19 has an electric servomotor 19.1, a threaded spindle 19.2 with its center line parallel to the machine axis MA, and a female thread fitting 19.3 connected to the outer container guide 16. The servomotor 19.1 drives the threaded spindle 19.2 so that it engages the female thread fitting 19.3.

Figure 4:
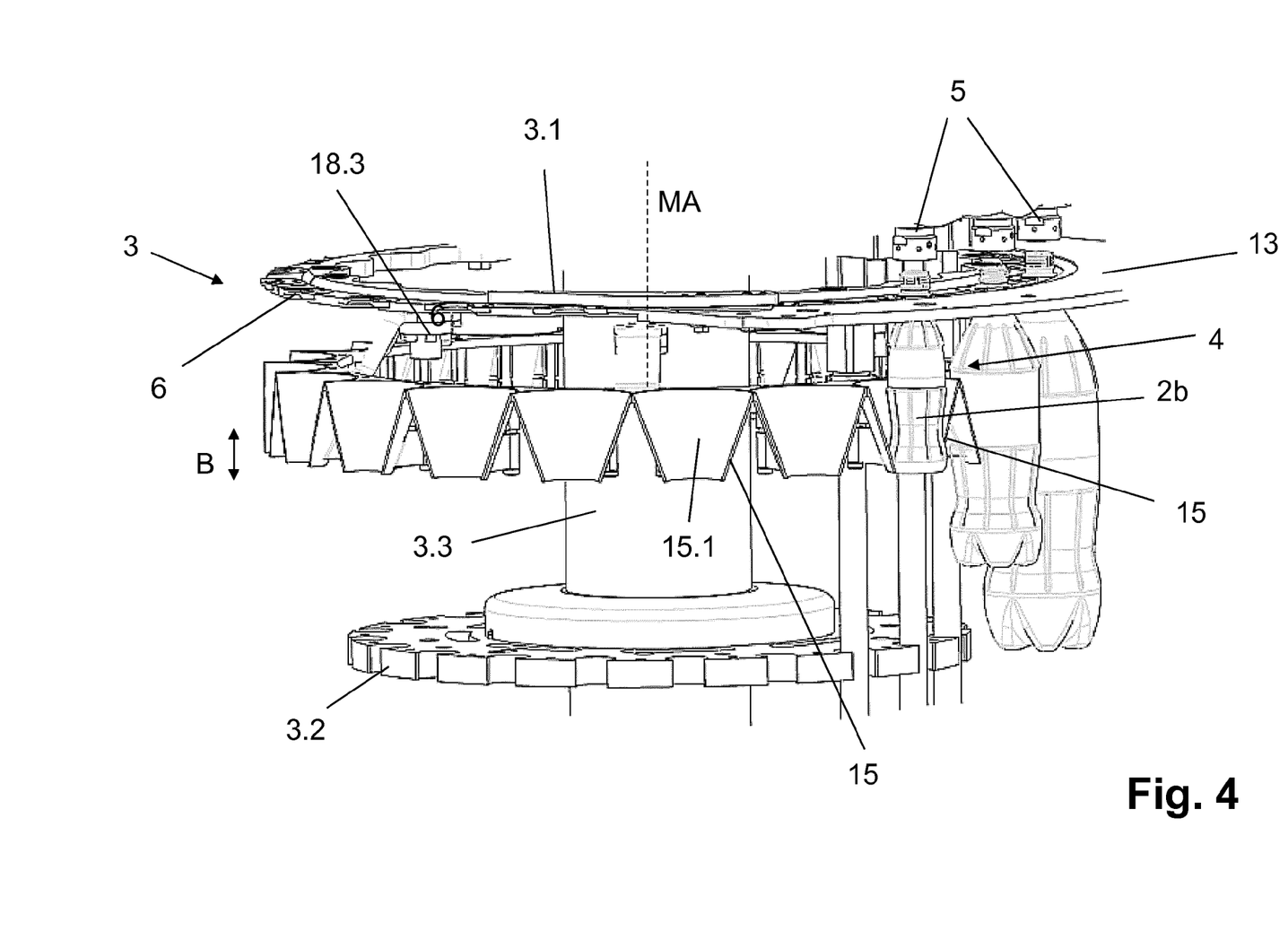
FIG. 4 shows a representation of a rotor from the container-treatment machine of FIG. 1 configured to treat a small container.
Figure 5:
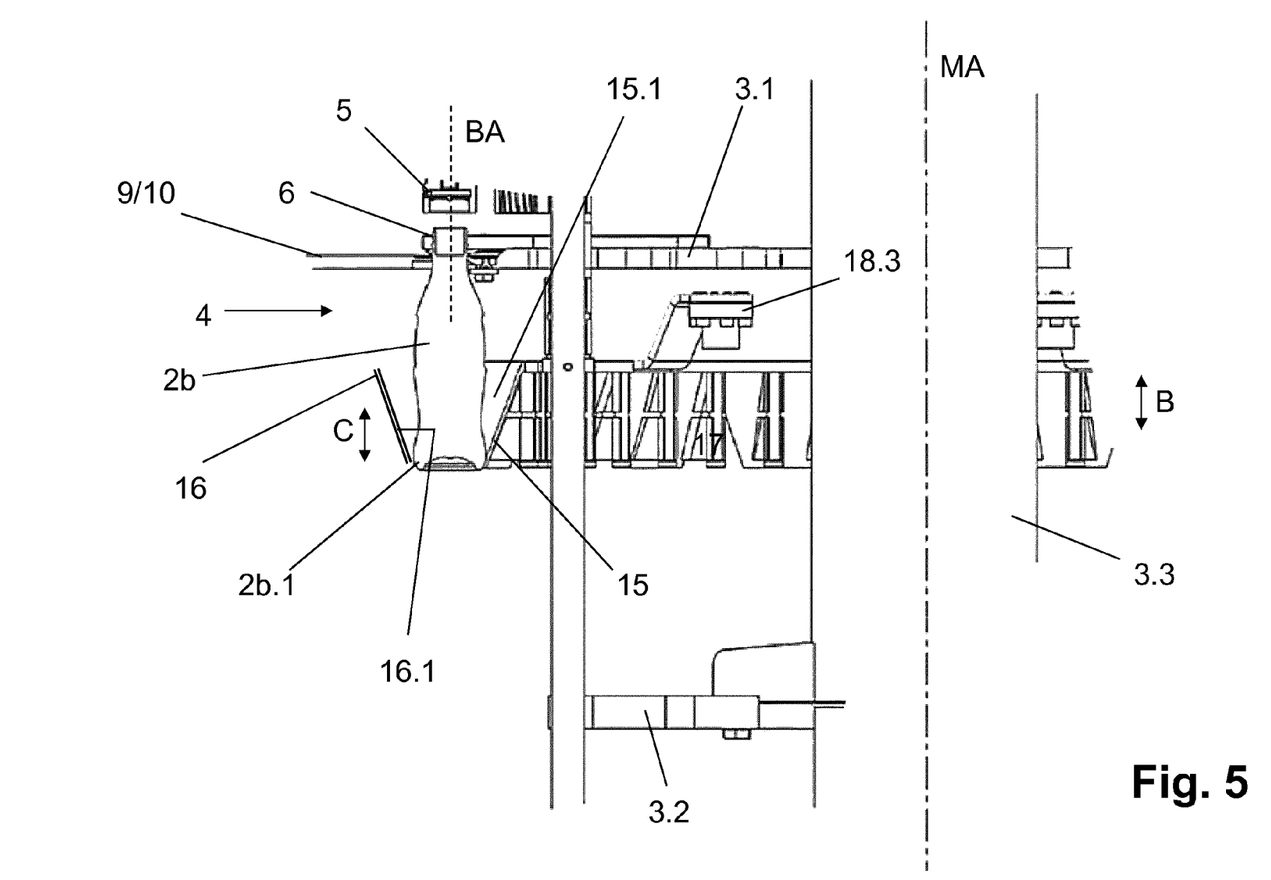
FIG. 5 shows a treatment position of the container-treatment machine of FIG. 1 configured to treat a small container.

FIGS. 2 and 3 show the carrier ring 17, the container pockets 15, and the outer container guide 16 in a first state in which they are configured for processing the large containers 2a. In this first state, these structures are all in their lowest height-adjustment positions of the height adjustment. FIGS. 4 and 5 show the carrier ring 17, the container pockets 15, and the outer container guide 16 in a second state in which they are configured for processing the small containers 2b. In this second state, these structures are all in their highest height-adjustment positions.

To process containers whose size and container diameter lie between the large container 2a and the small container 2b, the first and second adjustment devices 18, 19 execute an appropriate adjustment of container pockets 15 and of the outer container guide 16. In some embodiments, the adjustment is continuous. In others, it is in discrete steps.

The height adjustment is effected in such a way that, when adjusted correctly, the container pocket 15 supports the base 2a.1, 2b.1 of a container 2a, 2b with one side of the base 2a.1, 2b.1 resting on the outer container guide 16 and the other side of the base 2a.1, 2b.1 resting on the radially inner side of the container pocket 15.

Figure 7:
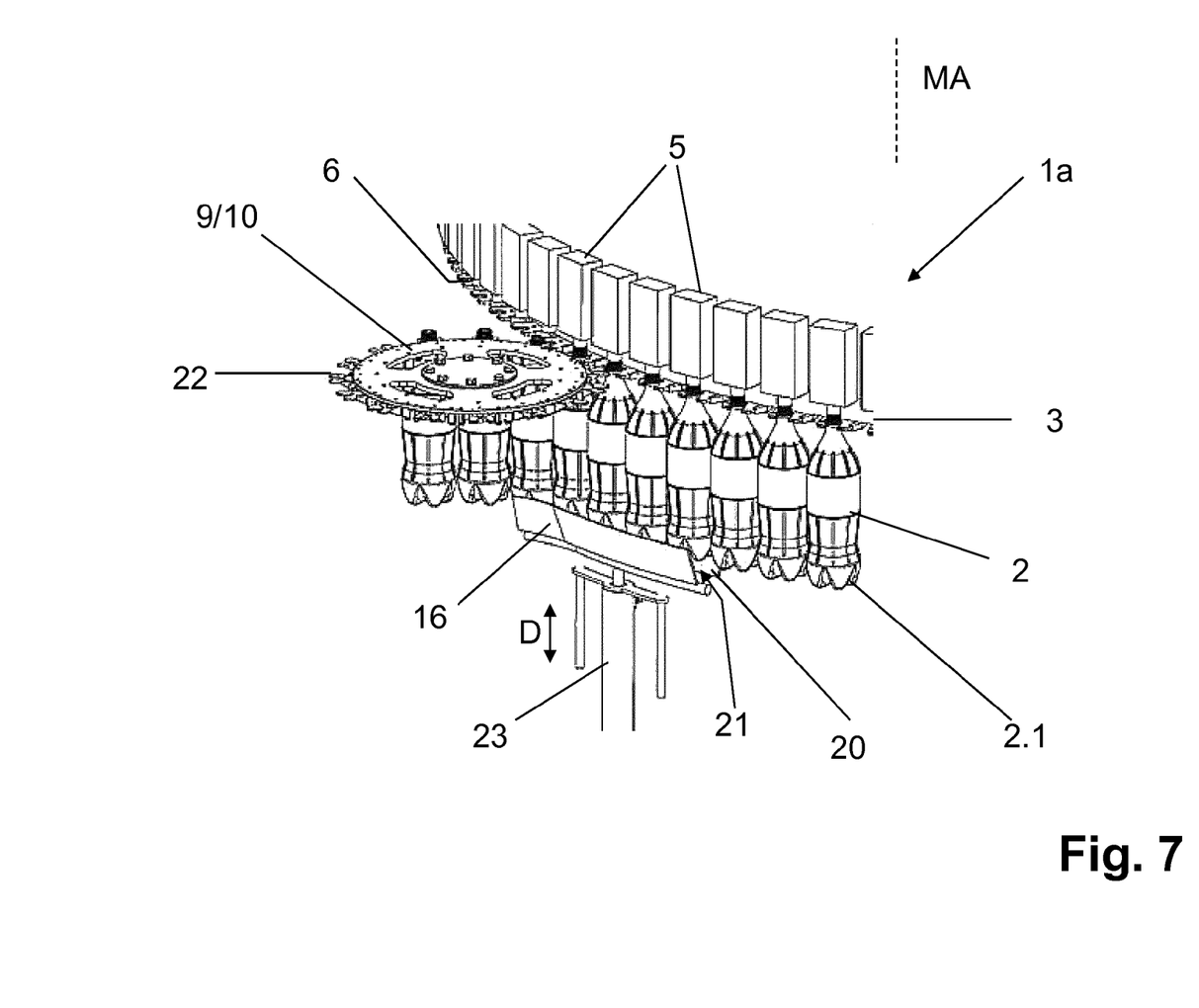
FIG. 7 shows a perspective partial view of the rotary rotor of a container treatment machine in the region of a container inlet or container outlet formed by a transport star, as viewed from above.
Figure 8:
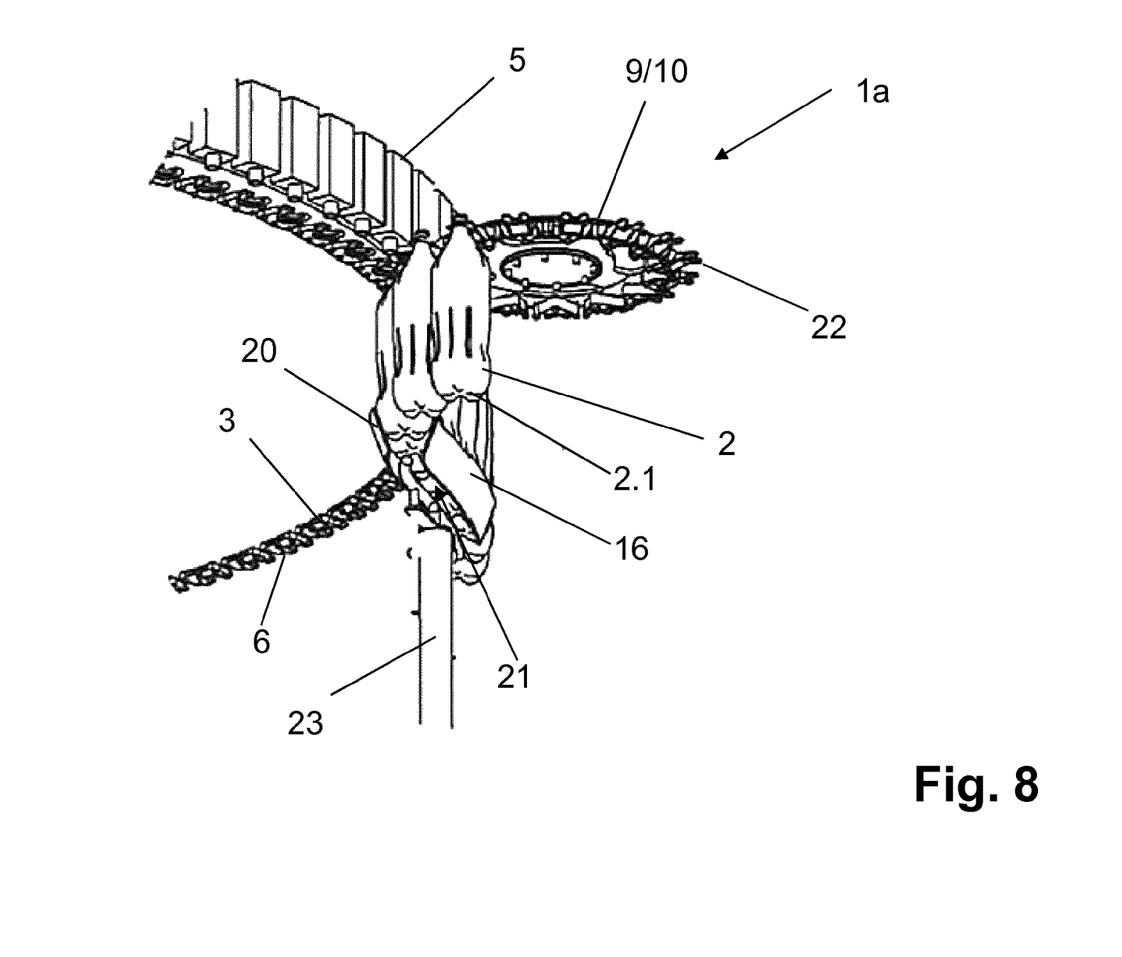
FIG. 8 shows a perspective partial view of the region of the container treatment machine of FIG. 7, as viewed from below.
Figure 9:
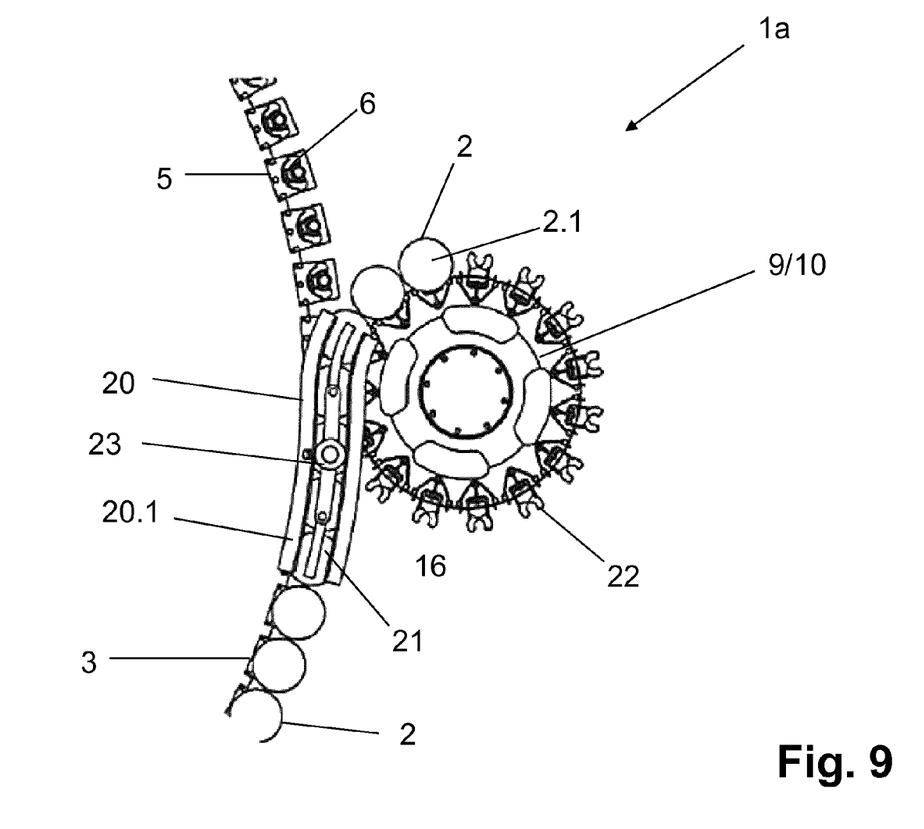
FIG. 9 shows a partial view from below of the region of the container treatment machine of FIG. 7.

FIGS. 7-9 show a container treatment machine 1a that uses a second embodiment of a container-support device 14a. In the illustrated embodiment, the container-support device 14a only extends over a region in which containers 2 are transferred from the first transport star 9 to the treatment positions 4 and/or over a region in which containers 2 are withdrawn by the second transport star 10 from treatment positions 4. The container support device 14a guides and support container bases 2.1 of suspended containers 2.

The container-support device 14a includes an outer container guide 16 and an inner container guide 20. The outer container guide 16 is further from the machine axis MA than the inner container guide 20. Neither the outer container guides 16 nor the inner container guide 20 rotates with rotor 3. As a result, the inner container guide 20 and the outer container guide 16 form between themselves a V-shaped gully 21 that serves as a guide channel. The gully 21 is open above and below. Its width decreases along a direction that is perpendicular to a transport direction of containers 2 with increasing vertical distance from the plane on which container carriers 6 move as the rotor 3 rotates.

When at the container inlet, the container support device 14a extends over a partial region of the transport trajectory of the containers 2 suspended on the first transport star 9, i.e. beneath the container carriers 22 that are provided on the first transport star 9 to suspend the containers 2, and over a short angular range of the rotary motion of the first transport star 9 and then again over an angular range of the rotary motion of rotor 3 beneath the local container carriers 6. When at the container outlet, the gully 21 extends along the trajectory of the containers 2 at the rotor 3 before the container outlet, i.e. over an angular range of the rotary motion of rotor 3 beneath the container carriers 6 before the container outlet, and then again over part of the transport trajectory of containers 2 at the second transport star 10, i.e. beneath the local container carriers 22 over an angular range of the rotary motion of the second transport star 10.

The container support device 14a is configured so that the gully's width at its top portion is equal or essentially equal to the base diameter of the large containers 2a and gully's width at its lowest portion is equal or essentially equal to the base diameter of small container 28.

To operate with a particular container diameter in between that of the large and small containers 2a, 2b, one operates an adjustment element 23 to raise or lower the outer and inner container guides along a vertical direction D. The resulting height adjustment ensures that the outer and inner container guides 16, 20 guide the bases of the containers.

In other embodiments, the container pockets 15 are not on an inner container guide 20. Instead, the container pockets 15 are arranged on the rotor 3 or on a local carrier ring 17 that rotates with the rotor 3.

In the embodiments described thus far, container support devices 14, 14a form receptacles for the base of the containers. Each receptacle has a top, a bottom, and a diameter. The top is closer than the bottom to the treatment heads 5 or the container carriers 6. The diameter monotonically decreases as one goes from the top to the bottom. Adjusting the heights of the support devices 14, 14a permits adaptation to different container sizes.

Having described the invention, and a preferred embodiment thereof, what is claimed as new, and secured by letters patent is:

1. An apparatus for processing containers, each of which has a base and a lateral surface adjacent to said base, said apparatus comprising a conveyor device having a rotor, container carriers, a container support device, an outer container guide, an outer container support surface, and an inner container support surface, wherein said rotor rotates about a vertical machine axis, wherein said container carriers are distributed on said rotor about said machine axis, wherein each of said container carriers suspends a container, wherein said container support device supports said suspended containers on said lateral surfaces thereof, wherein said container support device comprises said outer container guide, wherein said outer container guide comprises said outer container support surface, wherein said outer container support surface defines a tapered surface that surrounds said machine axis, wherein said outer container support surface supports said containers on a radially outward portion of said lateral surface, wherein said outer container support surface is height-adjustable for adaptation to different container base diameters, wherein said inner container support surface supports said containers on a radially inward position of said lateral surface, wherein said inner container support surface lies radially opposite said outer container support surface, wherein said inner container support surface and said outer container support surface define a receptacle for receiving a container base, wherein said receptacle has a width that decreases as a function of distance from said container carriers, and wherein said inner container support surface is height-adjustable for adapting aid container support device to different container base diameters.

2. The apparatus of claim 1, wherein said inner container support surface rotates with said rotor.

3. The apparatus of claim 2, further comprising container pockets, wherein said container pockets form said inner container support surface, wherein each of said pockets receives at least a part of a circumference of a container base, and wherein each of said pockets opens radially outward.

4. The apparatus of claim 3, wherein each container pocket is associated with a corresponding container carrier.

5. The apparatus of claim 3, wherein each of said container pockets defines a truncated cone.

6. The apparatus of claim 3, further comprising a carrier ring and an adjustment device, wherein said pockets are provided on said carrier ring, and wherein said adjustment device is configured to adjust a height of said carrier ring.

7. The apparatus of claim 1, further comprising an adjustment device, wherein said adjustment device is configured to adjust a height of said outer container guide.

8. The apparatus of claim 1, further comprising an adjustment device, wherein said inner container support surface is configured to not rotate with said rotor, wherein said inner container support surface forms, together with said outer container support surface, a gully that extends along a trajectory over which container bases of said containers move as said rotor moves said containers, and wherein said adjustment device is configured to adjust a height of said gully.

9. The apparatus of claim 8, wherein said gully extends into a transfer region at which containers are transferred to container carriers of said rotor or withdrawn from said container carriers of said rotor.

10. The apparatus of claim 8, wherein said gully extends into a region of a trajectory along which said container bases of said suspended containers traverse a path defined by a transport star at one of a container inlet and a container outlet.

11. The apparatus of claim 3, further comprising a carrier ring and a spindle drive, wherein said pockets are provided on said carrier ring, and wherein said spindle drive is configured to adjust a height of said carrier ring.

12. The apparatus of claim 1, further comprising a filling machine, wherein said container conveyor is a constituent of said filling machine.

13. The apparatus of claim 1, further comprising a capping machine, wherein said container conveyor is a constituent of said capping machine.

14. The apparatus of claim 1, further comprising a container-treatment machine, wherein said container conveyor is a constituent of said container-treatment machine.

* * * * *